(12) United States Patent
Tronnier et al.

(10) Patent No.: US 8,717,156 B2
(45) Date of Patent: May 6, 2014

(54) ADVANCED DRIVER ASSISTANCE SYSTEM HAVING A SENSOR ARRANGEMENT FOR DETECTING THE DISTANCE OF THE OWN VEHICLE FROM A FOREIGN OBJECT

(75) Inventors: Thorsten Tronnier, Erdweg (DE); Klaus Gresser, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 239 days.

(21) Appl. No.: 13/080,975

(22) Filed: Apr. 6, 2011

(65) Prior Publication Data

US 2012/0154135 A1    Jun. 21, 2012

(30) Foreign Application Priority Data

Dec. 17, 2010    (DE) .......................... 10 2010 063 420

(51) Int. Cl.
*B60Q 1/00* (2006.01)

(52) U.S. Cl.
USPC .......................... 340/435; 340/425.5; 700/300

(58) Field of Classification Search
USPC .............. 340/435, 436, 437, 438, 425.5, 901, 340/903, 904, 540; 700/300, 301, 302
See application file for complete search history.

(56) References Cited

U.S. PATENT DOCUMENTS

| | | | | |
|---|---|---|---|---|
| 5,269,308 | A * | 12/1993 | Hagiwara et al. | 600/455 |
| 5,612,686 | A * | 3/1997 | Takano et al. | 340/903 |
| 6,269,308 | B1 * | 7/2001 | Kodaka et al. | 701/301 |
| 6,926,374 | B2 * | 8/2005 | Dudeck et al. | 303/191 |
| 2006/0164219 | A1 | 7/2006 | Knoll | |
| 2008/0170142 | A1 * | 7/2008 | Kawata et al. | 348/294 |
| 2009/0138201 | A1 | 5/2009 | Eckstein et al. | |
| 2010/0253539 | A1 * | 10/2010 | Seder et al. | 340/903 |

FOREIGN PATENT DOCUMENTS

| | | |
|---|---|---|
| DE | 100 36 276 A1 | 2/2002 |
| DE | 102 53 509 A1 | 6/2004 |
| DE | 103 37 991 A1 | 3/2005 |
| DE | 10 2004 054 720 A1 | 5/2006 |
| DE | 10 2005 004 511 A1 | 8/2006 |
| DE | 10 2005 004 727 A1 | 8/2006 |
| DE | 10 2007 027 495 A1 | 12/2008 |
| DE | 10 2008 054 207 A1 | 6/2009 |

OTHER PUBLICATIONS

Thomas, Fabian, "BMW Drive Assist System: Lateral Collision Avoidance", Blog.MeinAuto.de, Oct. 12, 2010, <http://blog.meinauto.de/neuwagen-blog/5039/bmw-fahrassistensystem-lateral-collision-avoidance?show=slide>, (Twelve (12) pages including English-language translation).

"Lane change assist", Wikipedia, <http://de.wikipedia.org/wiki/Spurwechselassistent>, (Two (2) pages including English-language translation).

"BMW develops assist for tight spaces", Auto Motor Sport, Mar. 26, 2010, <http://www.auto-motor-und-sport.de/autokauf/engstellen-assistent-bmw-will-baustelle . . .>, (Six (6) pages including English-language translation).

German Office Action dated Jul. 25, 2011 including English-language translation (Ten (10) pages).

* cited by examiner

*Primary Examiner* — George Bugg
*Assistant Examiner* — Edny Labbees
(74) *Attorney, Agent, or Firm* — Crowell & Moring LLP

(57) ABSTRACT

An advanced driver assistance system for a vehicle is provided. The advanced driver assistance system includes a sensor arrangement for measuring the distance of a foreign object from the vehicle, and an electronic control unit for activating vehicle-internal actuators as a function of information obtained from a signal of the sensor arrangement. The sensor arrangement includes at least one sensor that is arranged on a longitudinal side of the vehicle and measures the distance of the foreign object from the longitudinal vehicle side. The control unit has a program module which emits a warning message to the driver during a forward drive by a connection to at least one of the actuators when the measured distance of the foreign object from the longitudinal vehicle side is smaller than a predefined safety distance.

10 Claims, 1 Drawing Sheet

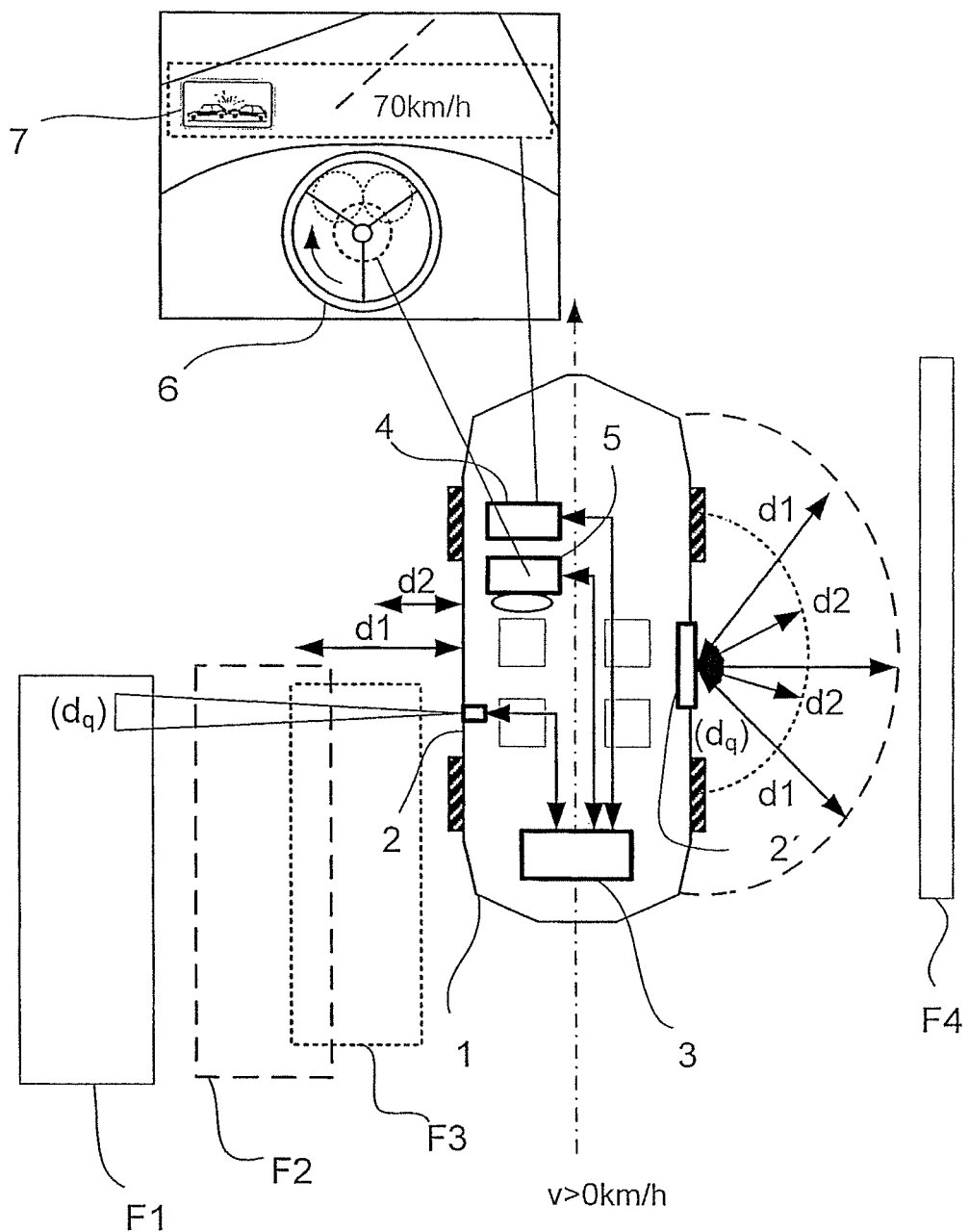

ADVANCED DRIVER ASSISTANCE SYSTEM HAVING A SENSOR ARRANGEMENT FOR DETECTING THE DISTANCE OF THE OWN VEHICLE FROM A FOREIGN OBJECT

CROSS-REFERENCE TO RELATED APPLICATION

This application claims priority under 35 U.S.C. §119 from German Patent Application No. DE 10 2010 063 420.4, filed Dec. 17, 2010, the entire disclosure of which is herein expressly incorporated by reference.

BACKGROUND AND SUMMARY OF THE INVENTION

The invention relates to an advanced driver assistance system having a sensor arrangement for detecting the distance of the own vehicle from a foreign object.

Such systems are known, for example, in connection with distance-controlled active cruise control systems (ACCs). Here, a speed control is implemented as a function of a distance from the vehicle driving ahead.

Furthermore, it is known in connection with parking aids, such as Parking Distance Controls (PDCs), to measure the distance from forward or rearward obstacles and to emit an acoustic and/or visual warning as a function thereof.

In addition, the applicant is developing a so-called Narrow-Passage Assistant by which a narrow passage is measured in an anticipatory fashion and the driver is informed as to whether this narrow passage is sufficiently wide for his vehicle to drive through.

Finally, Lane Departure Warning Systems or Lane-Change Assistants are known by which approaching vehicles are detected in an anticipatory fashion by means of sensors directed toward the rear and by which a warning is emitted in the event that a road marking is crossed or an intention of another lane change is recognized in the case of fast approaching vehicles.

It is an object of the invention to improve advanced driver assistance systems of the initially mentioned type with regard to further increasing safety.

The advanced driver assistance system according to exemplary embodiments of the invention, having a sensor arrangement for detecting the distance of the own vehicle from a foreign object and having an electronic control unit for activating vehicle-internal actuators as a function of information obtained from signals of the sensor arrangement, comprises at least one sensor that is arranged in a longitudinal side of the own vehicle and can be used for measuring the distance of a foreign object from this longitudinal vehicle side. In this case, the control unit has a program module by which a warning message can be emitted to the driver during a forward drive (in contrast to a parking operation) by means of a connection to at least one corresponding actuator, when the measured distance of a foreign object is narrower than a predefined safety distance. The warning message can be acoustic, visual and/or haptic. The distance may be a transverse distance of the foreign object from the longitudinal vehicle side.

Preferably an actuator for the output of a warning message is a first control device by which a warning message can be emitted in the form of a visual display, such as a symbol indicating the danger of an accident, in a heads-up display system. The driver is thereby warned most rapidly and is distracted the least from his viewing direction.

Additionally or as an alternative, an actuator is provided for the output of a warning message, preferably a second control device by which a haptic warning message can be emitted in the form of a countersteering torque at the steering wheel.

At least one sensor or one sensor arrangement respectively for detecting the distance of foreign objects is preferably provided on the two longitudinal vehicle sides (left and right). The control unit is then further developed such that a countersteering torque at the steering wheel as a warning message and for enlarging the distance from a foreign object (for example, on the left) will be applied only if, as a result, the distance on the other longitudinal vehicle side (for example, on the right) will not also become narrower than a predefined safety distance.

A countersteering torque at the steering wheel as a warning message and for enlarging the distance from a foreign object will preferably be applied only if, as a result, the own vehicle would not carry out a lane change.

In an advantageous further development of the invention, the actuator in the form of the first control device is activated by the control unit when the distance falls below a first safety distance, and the actuator in the form of the second control device is additionally activated when the distance falls below a second safety distance. In this case, the second safety distance is smaller than the first safety distance. In any case, both safety distances are smaller than 1 meter.

By means of a connection to a brake control device, the control unit can initiate an automatic braking intervention when a falling-below a predefined safety distance is maintained for a defined time period.

The invention is based on the following considerations, recognitions and ideas:

Starting Situation

Related art driverless transport systems use distance-measuring sensors, such as ultrasound- or laser-based sensors, for self-localization. By means of cameras, road markings are detected and lane departure warnings are emitted. The distance of the own vehicle from vehicles driving ahead is measured by means of radar or lidar sensors. Other vehicles situated in the blind spot of the own vehicle are detected, and the driver is warned if he wants to change lanes although the target lane is occupied. There are currently no functions which warn the driver of threatening collisions with vehicles on adjacent lanes and prevent these collisions when the other vehicles approach the own vehicle.

When driving on freeways or multilane country roads, it is a common occurrence that another vehicle is situated in the blind spot of the own vehicle. When this other vehicle now intentionally or unintentionally approaches the own vehicle, this may not be realized by the driver in time, and lead to a collision. The sensor system currently used for the detection of other vehicles on adjacent lanes is too inexact for calculating the time within which a collision will occur.

Idea

During the entire drive, the system according to exemplary embodiments of the invention will monitor the side area of the own vehicle by means of suitable sensors. These may, for example, be ultrasonic sensors.

As a result of the exact monitoring of the side area, the system according to exemplary embodiments of the invention knows vehicles on adjacent lanes and their distances from the own vehicle, as well as the distances from structural boundaries, such as guard rails, distance markers, construction site shut-off devices, walls and the like.

When the other vehicle comes too close to the own vehicle, a warning is emitted to the driver. This warning could, for example, be emitted by way of the heads-up display system. In another exemplary embodiment, the warning could also be emitted as an acoustic warning. If the other vehicle were to come still closer to the own vehicle, the driver can be warned by a slight steering torque in a further exemplary embodiment, which steering torque repels him away from the point of danger. This repelling may be a form of magnetic force which pushes the own vehicle away from the other vehicle, or makes a still closer approach to the other vehicle more difficult. Likewise, the warning and the torque may be applied when the own vehicle laterally approaches the other vehicle or a stationary object, such as walls, guard rails, etc. This torque may be applied only if sufficient space for an obstacle avoidance maneuver is still available on that side of the own vehicle into which the torque is to have its effect. In a further exemplary embodiment, the intervention in the trajectory of the own vehicle may be carried out by means of a targeted braking of individual wheels. In a further exemplary embodiment, the system can utilize additionally available lane information for repelling the own vehicle only within its own driving lane but not across road markings.

Up to now, the driver has been assisted by related art systems, such as an active cruise control and a lane departure warning as well as by a heading control, in standard situations should he overlook vehicles on adjacent traffic lanes when he changes a lane. However, if he is overlooked himself and another vehicle changes lanes although he is beside this vehicle, related art driver assistance systems cannot assist him. The assistance system according to exemplary embodiments of the invention expands the driver's cognitive capabilities and enables him to very rapidly react to dangerous situations which he would recognize too late without the system. This mainly takes place in a region that is not situated in the driver's primary field of view and can therefore not be monitored without any technical assistance. The system thereby increases the safety when traveling on freeways and other multilane roads in that it reduces the risk in dangerous situations.

Other objects, advantages and novel features of the present invention will become apparent from the following detailed description of one or more exemplary embodiments when considered in conjunction with the accompanying drawing.

BRIEF DESCRIPTION OF THE DRAWING

FIG. 1 is a schematic view of the most important components of the driver assistance system according to exemplary embodiments of the invention.

DETAILED DESCRIPTION OF THE DRAWING

FIG. 1 shows the own vehicle 1. The vehicle 1 is moving in the forward direction (indicated by the dash-dotted arrow) at a speed of v>0 km/h. It has a sensor arrangement 2 for detecting the lateral transverse distance $d_q$, for example, from foreign objects F1, F2 and F3 on the left longitudinal vehicle side, and a sensor arrangement 2' for detecting the lateral transverse distance $d_q$, for example, from foreign object F4 on the right longitudinal vehicle side. The sensors and sensor arrangements 2 and 2' may be identical but are shown here differently in order to explain examples of different types of sensors.

The sensor arrangement 2 shown here on the left longitudinal vehicle side may, for example, be a reasonably priced ultrasonic sensor that has a rather small aperture (as shown by the narrow beam). If necessary, two sensors of this type may be mounted on one longitudinal vehicle side when the sensor arrangement 2 is used.

The sensor arrangement 2' illustrated here on the right longitudinal vehicle side may, for example, be a radar sensor with a somewhat semicircular measuring range (as shown by the broken semicircle lines). As a result of the wider measuring range, a single sensor of this type may be sufficient. However, for a more precise localization of an object, an additional sensor may be advantageous.

The double arrows originating from the sensor arrangements 2 and 2' indicate a predefined first safety distance d1 and a smaller predefined second safety distance d2. The first safety distance d1 may, for example, be between 10 cm and 50 cm. The second safety distance d2 may, for example, be between 0 cm and 10 cm.

In the illustrated example, three other vehicles F1 to F3 are illustrated at a different lateral proximities on the left longitudinal side of the own vehicle 1. Vehicle F1 is farther away than the first safety distance d1. In this case, no measure has to be taken according to exemplary embodiments of the invention. Vehicle F2 falls only below the first safety distance d1; vehicle F3 also falls below the second safety distance d2. On the right longitudinal side of the own vehicle, a guide rail F4 is illustrated as a foreign object which is outside of the predefined safety distances d1 and d2.

Vehicle 1 has an electronic control unit 3 for activating vehicle-internal actuators 4 and/or 5 as a function of messages obtained from signals of the sensor arrangement 2 and/or 2'. For this purpose, the control unit 3, for example, has bus connections to the sensor arrangements 2 and/or 2' as well as to the actuators 4 and 5. Furthermore, the control unit 3 has a program module by which a warning message can be emitted to the driver during a forward drive (v>0 km/h, such as 70 km/h) when the measured distance $d_q$ of a foreign object F1, F2, F3, or F4 from the longitudinal vehicle side is narrower than a predefined safety distance d1 and/or d2. However, in this case, the system is not limited to 70 km/h. The speed could, for example, also be 130 km/h, or any other suitable speed.

By way of the connection with a control device 4 as the actuator, the control unit 3 preferably emits a visual warning message in the form of a display 7, shown here in the form of a symbol for a threatening accident risk, in a heads-up display system when the distance $d_q$ falls below a first safety distance D1, shown here in the case of foreign object F2. In addition, by way of the connection with a control device 5 as the actuator, the control unit 3 may emit a haptic warning message in the form of a countersteering torque at the steering wheel 6 when the distance $d_q$ falls below the second safety distance d2, shown here in the case of foreign object F3.

At least one sensor arrangement 2 and/or 2' respectively for detecting the distance $d_q$ from foreign objects F1, F2, F3 or F4 is preferably provided on the two longitudinal sides of the vehicle. The control unit 3 may then apply a countersteering torque to the steering wheel 6 as a warning message and for enlarging the distance $d_q$ from a foreign object (here, F3 on the left longitudinal vehicle side) only when, as a result, the distance $d_q$ on the other (here, right) longitudinal vehicle side does not also become narrower than a predefined safety distance (here, for example, d2 with respect to F4).

In a further development of the invention, the countersteering torque at the steering wheel 6 may be applied only if it would not cause the own vehicle 1 to carry out a lane change. For this purpose, the control unit 3 can cooperate with a lane-change assistant. However, in principle, exemplary embodiments of the invention can be used independently of whether a lane change is present or who (the own vehicle or the foreign object) carries out an approach action.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An advanced driver assistance system for a vehicle, the advanced driver assistance system comprising:
    a first sensor arrangement for measuring a distance of a first foreign object from the vehicle, wherein the first sensor arrangement is arranged on a first longitudinal side of the vehicle;
    a second sensor arrangement for measuring a distance of a second foreign object from the vehicle, wherein the second sensor arrangement is arranged on a second longitudinal side of the vehicle that is different from the first longitudinal side of the vehicle; and
    an electronic control unit for activating vehicle-internal actuators as a function of information obtained from a signal of the first sensor arrangement, wherein:
    the first sensor arrangement comprises at least one sensor which measures the distance of the first foreign object from the first longitudinal side,
    the control unit comprises a program module which emits a warning message to a driver of the vehicle during a forward drive by a connection to at least one of the actuators when the measured distance of the first foreign object from the first longitudinal side is smaller than a first predefined safety distance, and
    the control unit applies a countersteering torque at a steering wheel of the vehicle as the warning message and to enlarge the distance from the first foreign object with respect to the first longitudinal side of the vehicle only if the countersteering torque does not cause the distance from the second foreign object with respect to the second longitudinal side of the vehicle to become smaller than the first predefined safety distance.

2. The advanced driver assistance system according to claim 1, wherein a first one of the actuators is a first control device that emits the warning message as a visual display in a heads-up display system of the vehicle.

3. The advanced driver assistance system according to claim 2, wherein the visual display represents a symbol for an accident risk.

4. The advanced driver assistance system according to claim 1, wherein the control unit applies the countersteering torque at the steering wheel of the vehicle as the warning message and to enlarge the distance from the first foreign object only if the countersteering torque does not cause the vehicle to carry out a lane change.

5. The advanced driver assistance system according to claim 1, wherein the control unit causes an automatic braking intervention when the distance of the first foreign object from the first longitudinal vehicle side falls below the first predefined safety distance for a defined time period after the warning message is emitted.

6. A method of warning a driver of a vehicle, the method comprising the acts of:
    measuring a distance of a first foreign object from a first longitudinal side of the vehicle;
    measuring a distance of a second foreign object from a second longitudinal side of the vehicle, wherein the second longitudinal side of the vehicle is different from the first longitudinal side of the vehicle;
    emitting a warning message to the driver of the vehicle during a forward drive when the measured distance of the first foreign object from the first longitudinal side is smaller than a first predefined safety distance; and
    applying a countersteering torque at a steering wheel of the vehicle as the warning message and to enlarge the distance from the first foreign object with respect to the first longitudinal side of the vehicle only if the countersteering torque does not cause the distance from the second foreign object with respect to the second longitudinal side of the vehicle to become smaller than the first predefined safety distance.

7. The method according to claim 6, further comprising displaying the warning message as a visual display in a heads-up display system of the vehicle.

8. The method according to claim 7, wherein the visual display represents a symbol for an accident risk.

9. The method according to claim 6, wherein the act of applying the countersteering torque at the steering wheel of the vehicle as the warning message and to enlarge the distance from the first foreign object is performed only if the countersteering torque does not cause the vehicle to carry out a lane change.

10. The method according to claim 6, further comprising the act of causing an automatic braking intervention when the distance of the first foreign object from the first longitudinal vehicle side falls below the first predefined safety distance for a defined time period after the warning message is emitted.

* * * * *